July 2, 1935.  W. KUBICA  2,007,016

PHOTOGRAPHIC CAMERA

Filed Dec. 15, 1932

INVENTOR
Władysław Kubica
BY
George C. Heinrich
ATTORNEY

Patented July 2, 1935

2,007,016

UNITED STATES PATENT OFFICE 2,007,016

PHOTOGRAPHIC CAMERA

Władysław Kubica, Sanok, Poland, assignor to Ernst Leitz, Optische Werke, G. m. b. H., Wetzlar, Germany Application December 15, 1932, Serial No. 647,306
In Poland March 19, 1932

1 Claim. (Cl. 95—44)

This invention relates to improvements in photographic cameras, and it is the principal object of my invention to provide a photographic camera, plate or roll-film apparatus in which the regulating device for the distance meter is simultaneously regulating the focusing device for the objective so that during the focusing of the objective the glass of the distance meter serves simultaneously as finder of the apparatus.

The device greatly facilitates the taking of pictures, as it simplifies the necessary operations and enhances the control of the picture taking operation, because by means of a single operation (a) The distance between camera and subject is measured and simultaneously (b) Automatically the objective of the apparatus is focused in the most accurate or sharpest proportion to the measured distance while (c) The possibility is given to observe the subject and to examine the focus of the object in the moment of exposure.

These and other objects and advantages of my invention will become more fully known as the description thereof proceeds and will then be specifically defined in the appended claim.

In the accompanying drawing, forming a material part of this disclosure:

Figure 1:
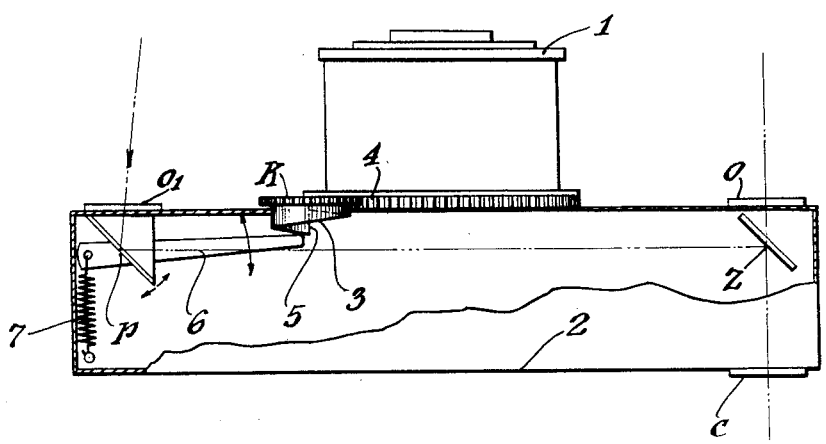
Fig. 1 is a side elevation of a camera constructed according to my invention, the distance meter is shown in dark full lines.
Figure 2:
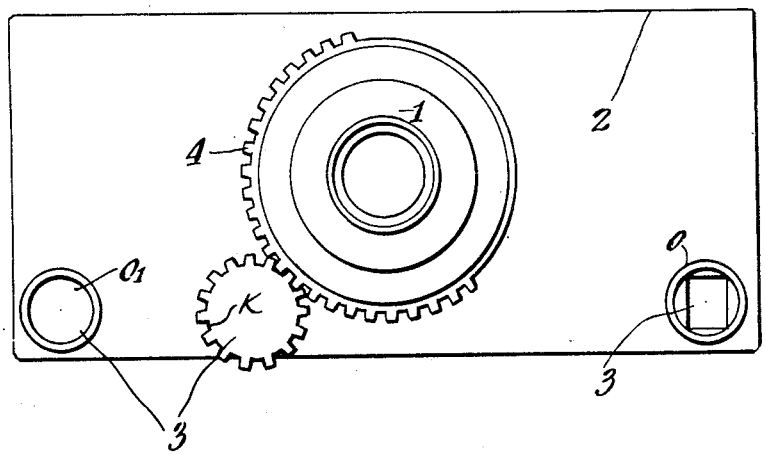
Fig. 2 is a front elevation of the camera.

As illustrated, a camera 2 with the usual objective and its tube 1, has a distance meter 3 built into its casing comprising the ocular C and the objective O which together form the show glass of the distance meter and simultaneously constitute the finder of the apparatus also. The distance meter furthermore has another objective O', connected by the intermediary of a prism mirror p with the finder C—O and also by means of an angularly disposed, transparent mirror Z.

The distance meter furthermore includes a small wheel K connected by means of a suitable transmission as for instance a curve 5 and a lever 6, controlled by a spring 7 with a prism mirror p in such a manner that the rotation of the small wheel K controls the inclination of the mirror.

In operation, a glance through finder C—O will allow an observation of the subject simultaneously from two points i. e. through the objective O and the objective O'. The inclination of the mirror p in the moment at which the contours of the visored subject intersect on one line determines the distance of this subject from the camera.

If the small wheel K is connected with the telescoping mechanism of the tube 1 by a suitable transmission, for instance as shown by a gear system, the rotation of the wheel K simultaneously with the intersection of the contours of the visored subject will automatically effect the focusing of the objective. It will be understood that my above described device may also be used with cameras of other construction than disclosed, as for instance bellows cameras in which however the transmission mechanism of wheel K and the objective focusing mechanism are suitably connected.

While I have described and shown the preferred form of my construction as one example only of the many possible ways to practically construct my camera, I may make such changes in the general arrangement of the same and in the construction of its minor details as come within the scope of the appended claim without departure from the spirit of my invention and the principles involved.

Having thus described my invention, what I claim as new and desire to secure by Letters Patent is:

In a photographic camera, a focusing mechanism, comprising a distance meter and its spring controlled operating lever, a prism mirror thereon and an angularly disposed mirror located in the same horizontal plane with the prism mirror, said mirrors having means whereby the object may be directly observed, an objective, a rotatable tube therefor, gear teeth on said tube, a small gear juxtaposed to said tube and in mesh with said tube gear teeth, a curve associated with said small gear engaging said lever, the rotation of said small gear controlling the inclination of said prism mirror, to effect the adjustment of the distance meter to a desired distance and simultaneously automatically the adjustment of the camera objective to the focus corresponding to said distance.

WŁADYSŁAW KUBICA.